No. 790,661. PATENTED MAY 23, 1905.
E. H. REED.
MACHINE FOR MANUFACTURING BUILDING BLOCKS.
APPLICATION FILED SEPT. 29, 1904.
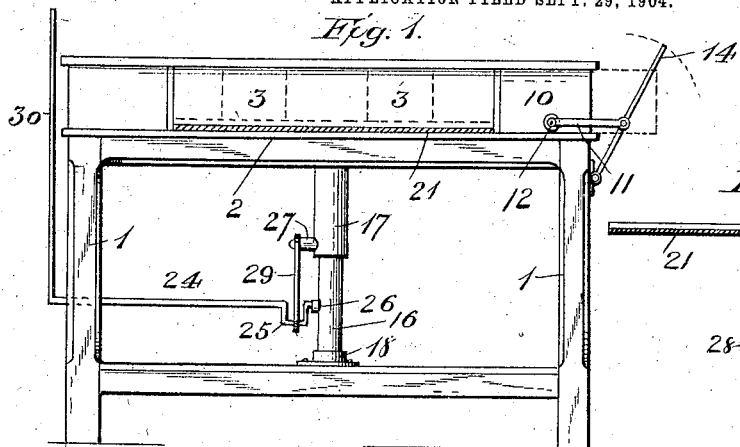
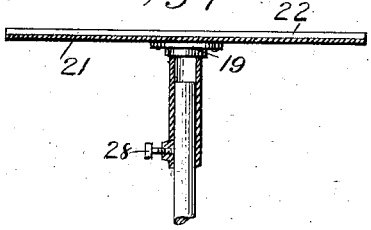
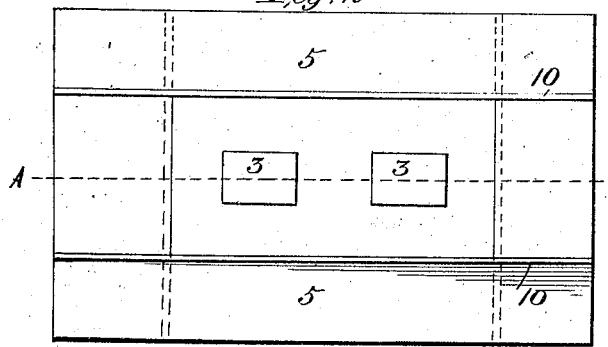
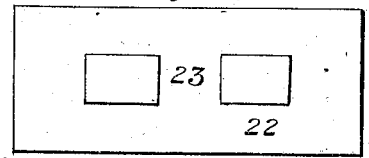
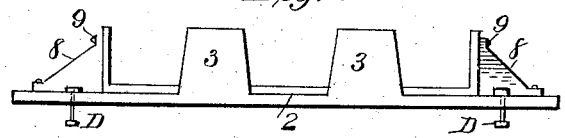
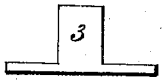
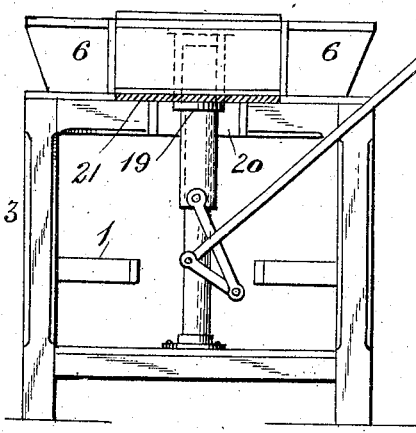
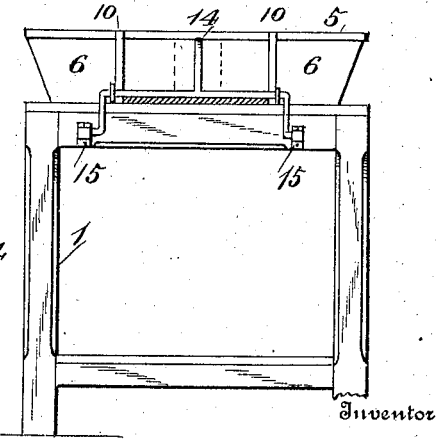
Witnesses
F. L. Ourand
Wm. E. Boulter
Inventor
Elmer H. Reed,
By C. A. Brandenburg
Attorney No. 790,661. Patented May 23, 1905.

UNITED STATES PATENT OFFICE.

ELMO H. REED, OF WICHITA, KANSAS.

MACHINE FOR MANUFACTURING BUILDING-BLOCKS.

SPECIFICATION forming part of Letters Patent No. 790,661, dated May 23, 1905.

Application filed September 29, 1904. Serial No. 226,570.

*To all whom it may concern:*

Be it known that I, ELMO H. REED, a resident of Wichita, in the county of Sedgwick and State of Kansas, have invented certain new and useful Improvements in Machines for Manufacturing Building-Blocks; and I do hereby declare the following to be a full, clear, and exact description of the invention, such as will enable others skilled in the art to which it appertains to make and use the same.

The invention relates to machines for the manufacture of building-blocks, being more especially designed for use in the formation of blocks from a plastic mixture of artificial stone. In the manufacture of such stone great care has to be taken to remove the mold and in such a manner as not to disturb the surface of the block, and if the block is too wet it would stick to the mold and thereby injure said block. If said stone is worked too dry, it detracts from its efficiency. If the surface of said stones are thoroughly troweled after completed, it is a great benefit to them. My machine is designed to obviate all these difficulties hereinbefore mentioned by troweling the surface of the block before removing from the mold, and instead of removing the mold from the block my machine pushes the block from the mold. I obtain these objects by the mechanism illustrated in the accompanying drawings, in which—

Figure 1 is a view in perspective of my entire machine; Fig. 2, a plan view of same. Figs. 3 and 4 are end elevations; Fig. 5, a longitudinal section on the line A B, Fig. 2; Fig. 6, a follow-board on which the building-block rests while undergoing formation; Fig. 7, a telescopic pedestal; Fig. 8, a core around which the block is formed.

Similar characters refer to similar parts throughout the several views.

As shown in the drawings, 1 is a suitable frame or table on top of which is secured by bolts D a cast-iron plate having vertical extensions 3, 6, and 7, the purpose of which will be more fully explained hereinafter. A shelf 5 is secured on top of the extensions 6 and 7, as seen in Fig. 2, on which is placed material to be molded. The sides of the mold are made by plate of iron 10, set on edge and supported against inside pressure by the extension 6; the ends of the mold are the extension 7, supported by a brace 8, riveted to the plate 2 and extensions 7; the extensions 3 form cores in the molded block. A vertical standard 16, having a collar 18 secured to one end thereof by any suitable means, is bolted to the frame 1. A hollow tube 17 is placed on the standard 16, as clearly seen in Fig. 7. A collar 19 is secured on the top end thereof.

The tube 17 extends vertically through an aperture 20 in the plate 2, as shown in Fig. 3, having mounted thereon a cross-head 21, as shown in Fig. 6, and is normally positioned in the bottom of the mold, the extensions 3 passing up through said cross-head, which extensions form apertures in the central portion of the blocks. A lever 30, having a bend 24 and a crank 25, is pivoted to the frame 1 and the standard 16. The tube 17, with a base 27, which is provided with a screw 28. The crank 25, is connected to the tube 17, by means of a link 29. It is apparent that when the lever 30 is shifted back and forth the tube 17 will be slid up and down, which will move the cross-head 21 up and down in the mold. A lever 14, bent in the form shown in Fig. 4, is pivoted by a staple 15 to the frame 1. Said lever is connected to the bars 10 by a link 11, as illustrated, Fig. 1. A follow-board 22, having apertures 23, is made just the size of the mold and is placed in the bottom thereof and rests on the cross-head 21. The mold ends 7 and the longitudinal bars 10 determine the dimensions of the block to be made. It will be seen by Fig. 1 that by the operation of the lever 14 the bars 10 are shifted back and forth longitudinally, as indicated by the dotted lines, which will trowel the sides of the block smooth, bring the cement to the surface, thereby making a block far superior to one which has not been troweled, the mold being filled with plastic material, tamped down, and gaged off smooth with the top thereof. When it is desired to eject the building-block from the machine, the lever 30 is moved, as shown by the dotted lines, the link 29 will push the tube 17 up, and the cross-head 21 will push the follow-board and the molded block up out of the mold and off of the cores 3, (the plate 2 being secured to the frame 1.) It will be seen the sides of the molded block will be made smooth by being in slidable contact with the walls of the mold while being pushed out of the mold. Thus I have a finished block troweled down smooth on its surface, whereas it would be left rough and uneven if the mold was opened up at the corners and removed from the building-block, as is usually done.

Having thus described the details of construction of my machine and the best method of operating the same, what I claim, and wish to secure by United States Patent, is—

1. In a machine for molding building-blocks, a table, a plate affixed to the top thereof having vertical extensions, two of said extensions forming ends for the mold, a pair of bars extending longitudinally to form the sides of said mold and supported against inside pressure by the plate extensions 6, a link pivotally connecting said plates to a lever whereby said bars can be reciprocated, substantially as described.

2. In a machine for making building-blocks, the combination of a table, a telescopic standard, a lever and a crank, a link connecting said crank to the upper portion of the said standard a cross-head rigidly secured to said standard and the reciprocating bars to trowel the outer surface of the building-block, substantially as described.

In testimony whereof I have signed this specification in the presence of two subscribing witnesses.

ELMO H. REED.

Witnesses:
PAUL BROWN,
EZRA E. BEARD.